(12) United States Patent
Harada et al.

(10) Patent No.: US 8,901,482 B2
(45) Date of Patent: Dec. 2, 2014

(54) RADIOGRAPHIC IMAGING APPARATUS, METHOD AND PROGRAM

(75) Inventors: Daiki Harada, Kanagawa-ken (JP);
Futoshi Yoshida, Kanagawa-ken (JP);
Yasunori Ohta, Kanagawa-ken (JP);
Yuusuke Kitagawa, Kanagawa-ken (JP);
Takeshi Kamiya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 902 days.

(21) Appl. No.: 12/926,766

(22) Filed: Dec. 8, 2010

(65) Prior Publication Data

US 2011/0192966 A1 Aug. 11, 2011

(30) Foreign Application Priority Data

Feb. 9, 2010 (JP) ................................. 2010/026168

(51) Int. Cl.
*G01T 1/24* (2006.01)
*G01T 7/00* (2006.01)

(52) U.S. Cl.
CPC ...................................... *G01T 7/005* (2013.01)
USPC .............. 250/252.1; 250/370.08; 250/390.02; 378/172

(58) Field of Classification Search
USPC .............. 250/252.1, 370.08, 390.02; 378/172
See application file for complete search history.

(56) References Cited

U.S. PATENT DOCUMENTS

| | | | |
|---|---|---|---|
| 6,476,394 B1* | 11/2002 | Amitani et al. | 250/368 |
| 6,989,538 B2* | 1/2006 | Petrick et al. | 250/370.09 |
| 7,381,964 B1* | 6/2008 | Kump et al. | 250/370.11 |
| 7,519,156 B2 | 4/2009 | Marar | |
| 2006/0097177 A1* | 5/2006 | Yamamoto | 250/370.08 |
| 2008/0237507 A1 | 10/2008 | Enomoto | |
| 2011/0147601 A1* | 6/2011 | Niekawa et al. | 250/370.09 |

FOREIGN PATENT DOCUMENTS

| | | |
|---|---|---|
| JP | 2001-149355 A | 6/2001 |
| JP | 2002-336225 A | 11/2002 |
| JP | 2005-111054 A | 4/2005 |
| JP | 2005-204857 A | 8/2005 |
| JP | 2007-185375 A | 7/2007 |

OTHER PUBLICATIONS

Notice of Grounds for Rejection issued by Japanese Patent Office (JPO) on Jul. 23, 2013, in connection with corresponding Japanese Patent Application No. 2010-026168.
First Notification of Office Action issued by the State Intellectual Property Office of China (SIPO) on Mar. 3, 2014 in connection with CN201010622350.3.

* cited by examiner

*Primary Examiner* — David Porta
*Assistant Examiner* — Djura Malevic
(74) *Attorney, Agent, or Firm* — Jean C. Edwards, Esq.; Edwards Neils PLLC

(57) ABSTRACT

At least one of conditions including that power is applied to a radiation detector, that a predetermined time period has elapsed from the application of power, and that the radiation detector is connected is detected. When at least one of the conditions is detected, determination is made as to whether or not calibration information of the currently used radiation detector is appropriate. If a negative determination is made, control is exerted to enable calibration.

6 Claims, 3 Drawing Sheets

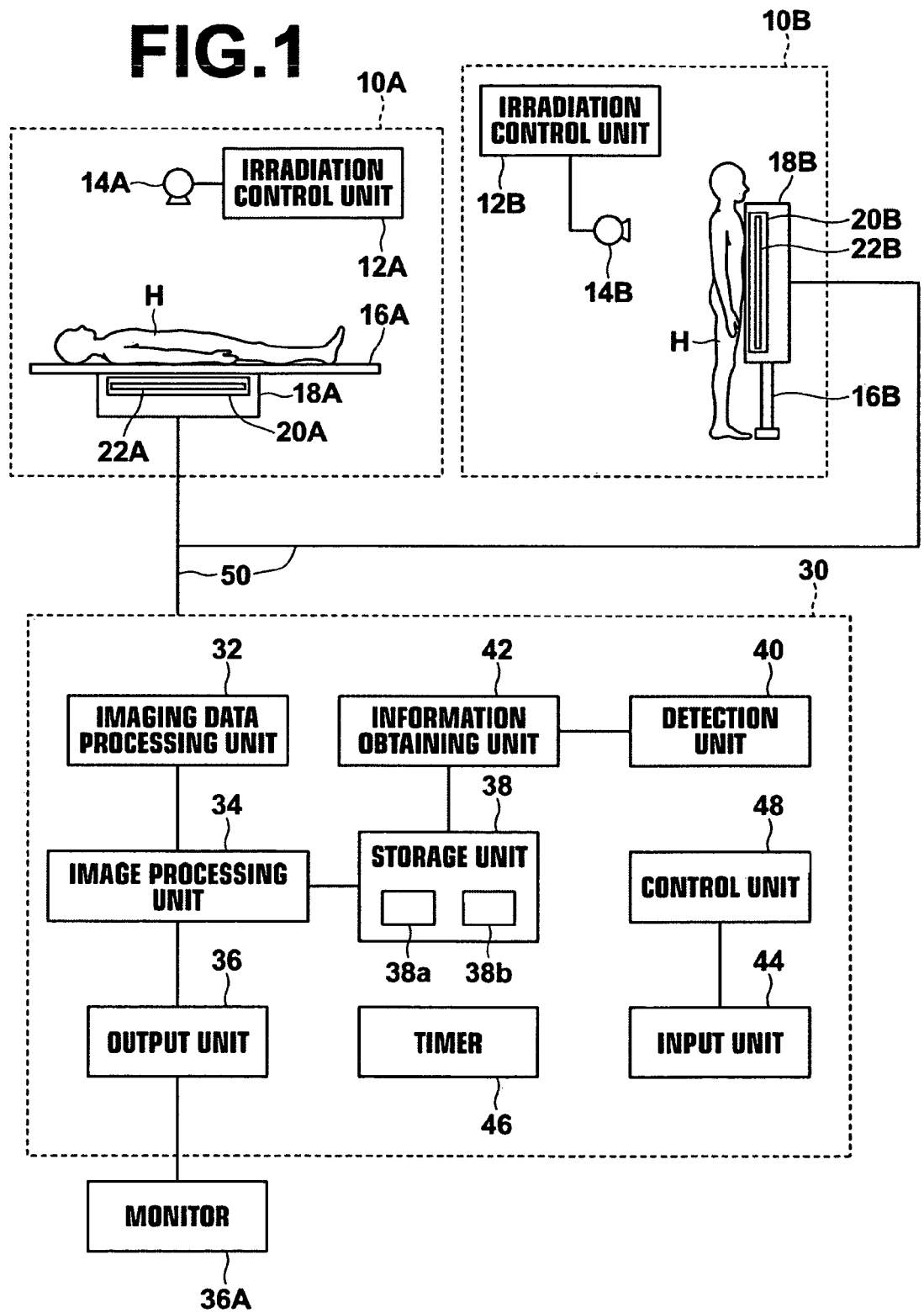

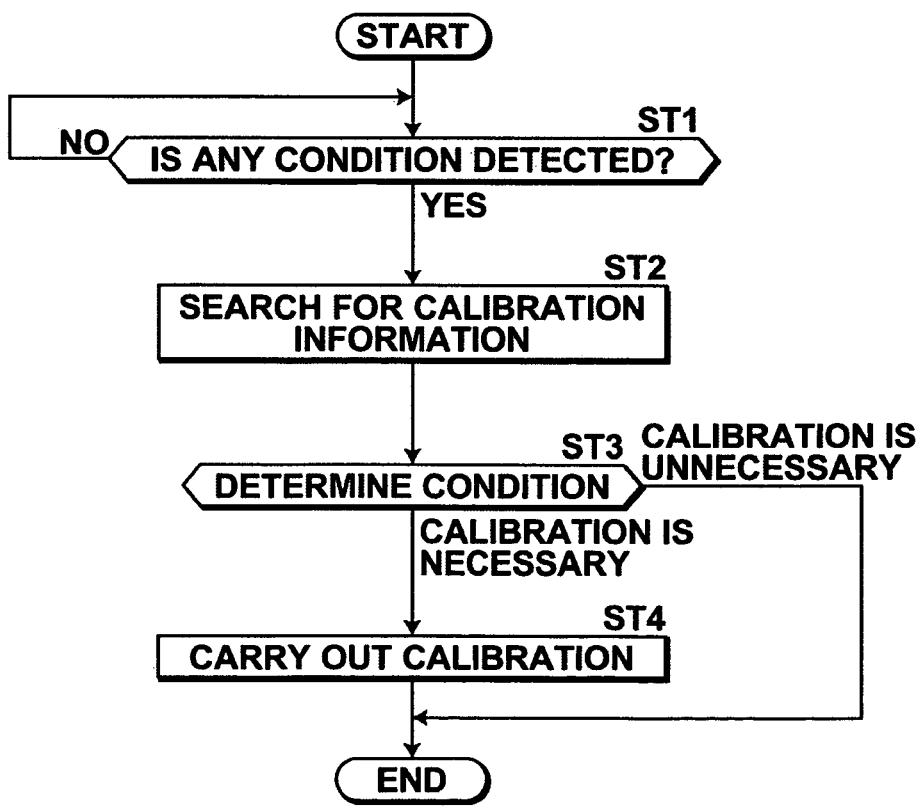

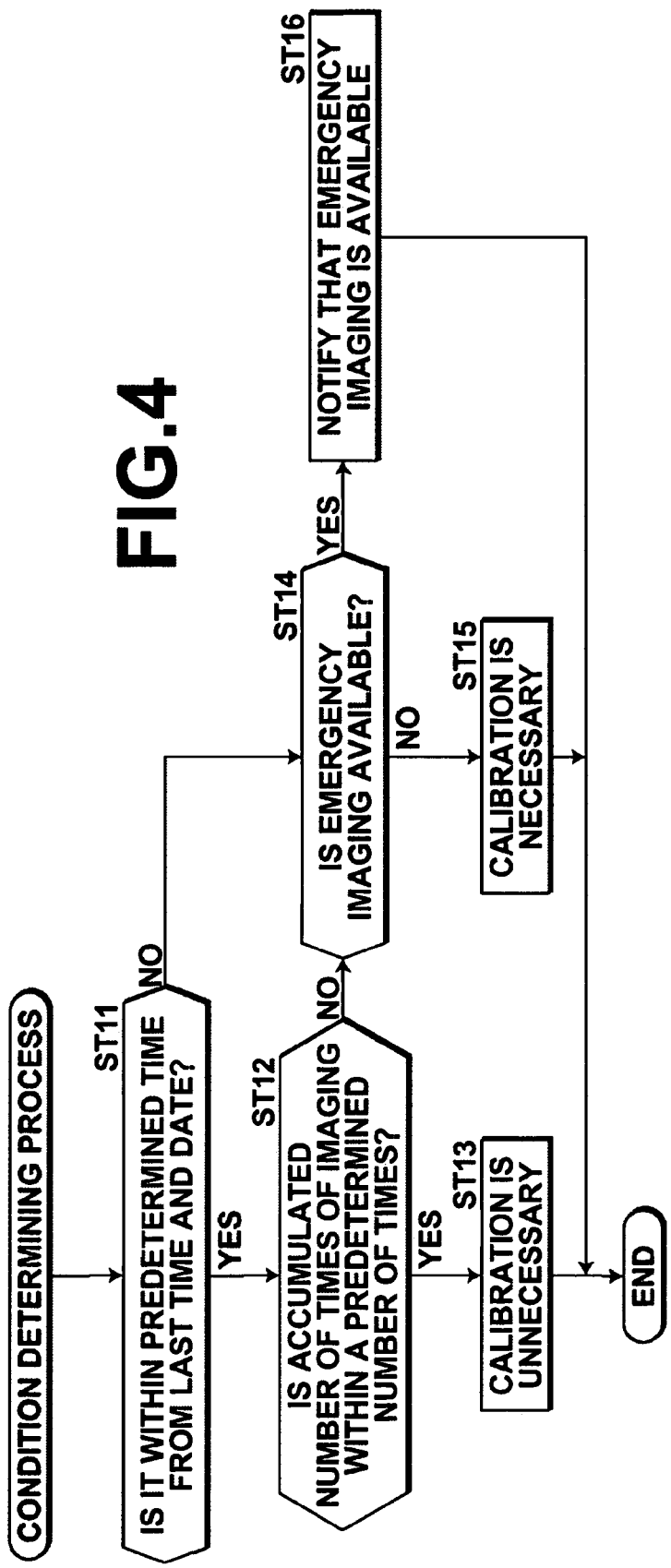

RADIOGRAPHIC IMAGING APPARATUS, METHOD AND PROGRAM

CROSS-REFERENCE TO RELATED APPLICATIONS

The present application claims priority from Japanese Patent Application No. 026168/2010, filed Feb. 9, 2010, the contents of which are herein incorporated by reference in their entirety.

BACKGROUND OF THE INVENTION

1. Field of the Invention

The present invention relates to a radiographic imaging apparatus and a radiographic imaging method for carrying out calibration of a radiation detector when a radiographic image of a subject is taken using the radiation detector, as well as a program for causing a computer to function as the radiographic imaging apparatus.

2. Description of the Related Art

Conventionally, various types of radiation detectors (so-called "flat panel detectors", which are hereinafter referred to as "FPDs"), which record a radiographic image of a subject formed by radiation transmitted through the subject, have been proposed and reduced into practice in the medical field, etc. An example of such a FPD is a FPD using a semiconductor, such as amorphous selenium, which generates an electric charge when exposed to radiation. As this type of FPD, those of so-called optical reading system and of TFT reading system have been proposed. Further, various types of cassettes, which include, in a case thereof, a FPD and an image memory serving as storage means for storing radiographic image data outputted from the FPD, have been proposed. Furthermore, among this type of cassettes, those provided with a function to send radiographic image data detected by the FPD to a processor via wireless communication have been proposed, so that the processor applies signal processing, such as image processing, to the radiographic image data.

When a radiographic image is taken using the FPD, it is necessary to carry out calibration before actual imaging to correct for variation in sensitivity, etc. To this end, various techniques for carrying out calibration in an imaging apparatus have been proposed (see U.S. Pat. No. 7,519,156, Japanese Unexamined Patent Publication Nos. 2005-111054 and 2002-336225, which are hereinafter referred to as Patent Documents 1 to 3, respectively). In these techniques, calibration is carried out when a power supply to the FPD is turned on or when a predetermined time period has elapsed after the power supply is turned on, for example, and calibration data obtained during the calibration is stored in the imaging apparatus with being associated with the FPD or a cassette containing the FPD. Then, during imaging, radiographic image data obtained by the imaging is corrected using the calibration data. Further, a technique to detect a newly connected cassette and carry out calibration has been proposed (see Japanese Unexamined Patent Publication No. 2005-204857, which is hereinafter referred to as Patent Document 4).

Since the FPDs deteriorate as an accumulated time for which the power is supplied thereto increases, it is necessary to update the calibration data on a regular basis. In the techniques disclosed in Patent Documents 1 to 4, however, timing of updating the calibration data is not mentioned. Therefore, the calibration may be carried out even at timing when it is unnecessary. Further, in the case of a cassette capable of wireless communication, the cassette contains a battery for driving the radiation detector. In this case, the power supply is frequently turned on or off in order to prevent wasteful power consumption by the battery. If the timing of calibration is set such that the calibration is carried out each time the power supply is turned on, it is impossible to carry out imaging immediately after the power supply is turned on, and this impairs efficiency of the imaging.

SUMMARY OF THE INVENTION

In view of the above-described circumstances, the present invention is directed to allowing appropriate calibration when a radiographic image is taken using a radiation detector.

An aspect of the radiographic imaging apparatus according to the invention is a radiographic imaging apparatus for taking a radiographic image of a subject using a radiation detector. The apparatus includes:

information obtaining means for obtaining calibration information by carrying out calibration of the radiation detector;

storage means for storing the calibration information of at least one radiation detector with associating the calibration information with the at least one radiation detector;

image processing means for applying image processing to the radiographic image of the subject detected by the radiation detector based on the calibration information;

detecting means for detecting at least one of conditions including that power is applied to the radiation detector, that a predetermined time period has elapsed from the application of power, and that the radiation detector is connected; and control means for determining, when at least one of the conditions is detected by the detecting means, whether or not the calibration information of the currently used radiation detector is appropriate, and if a negative determination is made, controlling the information obtaining means to enable the calibration.

The description "enable the calibration" herein refers not only to immediately carrying out the calibration, but also refers to notifying that the calibration is necessary, carrying out the calibration when an instruction is received or carrying out the calibration when a certain time has elapsed, for example. If a negative determination is made, the calibration is not carried out.

The "calibration information" includes, besides the calibration data, time and date when the calibration is carried out and the accumulated number of times of imaging with each radiation detector, for example. The calibration information may further include information about whether or not emergency imaging is available in the case where it is necessary to immediately carry out imaging, such as the case of an urgent patient.

In the case where the connection of the radiation detector is achieved via wired connection using a cable, the condition "that the radiation detector is connected" refers to that the radiation detector is connected to the cable. In the case where the connection of the radiation detector is achieved via wireless connection, the condition "that the radiation detector is connected" refers to that communication between the radiation detector and the apparatus is established, which is detected when the apparatus communicates with the radiation detector and recognizes the radiation detector.

In the radiographic imaging apparatus according to the invention, the control means may determine, with respect to the currently used radiation detector, that the calibration information is not appropriate if a predetermined time period has elapsed from a time and date when the last calibration was carried out and/or if an accumulated number of times of imaging with the radiation detector has exceeded a predetermined number of times.

In the radiographic imaging apparatus according to the invention, the control means may determine, with respect to the currently used radiation detector, whether or not emergency imaging is available, and if a negative determination is made as to whether or not the calibration information is appropriate and if an affirmative determination is made as to the availability of the emergency imaging, the control means may control the information obtaining means to notify that the emergency imaging is available.

In the radiographic imaging apparatus according to the invention, the control means may stop the calibration if an instruction to carry out imaging using the radiation detector is fed when the information obtaining means is obtaining the calibration information.

In the case where the currently used radiation detector is a rechargeable wireless radiation detector, the control means may determine whether or not the currently used radiation detector is being recharged, and if an affirmative determination is made, the control means may enable the calibration.

If a negative determination is made as to whether or not the currently used radiation detector is being recharged, it is highly likely that imaging will be carried out using the radiation detector, and therefore the calibration is not carried out.

An aspect of the radiographic imaging method according to the invention is a radiographic imaging method for use with a radiographic imaging apparatus for taking a radiographic image of a subject using a radiation detector, the apparatus including: information obtaining means for obtaining calibration information by carrying out calibration of the radiation detector; storage means for storing the calibration information of at least one radiation detector with associating the calibration information with the at least one radiation detector; and image processing means for applying image processing to imaging data of the radiographic image of the subject detected by the radiation detector based on the calibration information. The method includes:

detecting at least one of conditions including that power is applied to the radiation detector, that a predetermined time period has elapsed from the application of power, and that the radiation detector is connected;

determining, when at least one of the conditions is detected by the detecting means, whether or not the calibration information of the currently used radiation detector is appropriate; and if a negative determination is made, controlling the information obtaining means to enable the calibration.

The invention may also be implemented in the form of a program for causing a computer to function as the radiographic imaging apparatus according to the invention.

According to the present invention, the conditions including that power is applied to the radiation detector, that a predetermined time period has elapsed from the application of power, and that the radiation detector is connected are detected. If at least one of the conditions is detected, determination is made as to whether or not the calibration information of the currently used radiation detector is appropriate. If a negative determination is made, the calibration is enabled. Therefore, even in the case where the power supply is frequently turned on or off, as in the case of a wireless cassette, a new calibration operation is not carried out when it is unnecessary to update the calibration information. In this manner, efficient calibration can be achieved without impairing the imaging efficiency.

Further, even if a negative determination is made as to whether or not the calibration information with respect to the currently used radiation detector is appropriate, determination is made as to whether or not emergency imaging is available. If an affirmative determination is made as to the availability of the emergency imaging, it is notified that the emergency imaging is available. In this manner, such a situation that the calibration is carried out when it is necessary to immediately carry out the imaging, such as in the case of an urgent patient, can be prevented.

Further, if an instruction to carry out imaging using the radiation detector is fed when the calibration information is being obtained, the operation to obtain the calibration information can be stopped to carry out the imaging, as necessary.

In the case where the currently used radiation detector is a rechargeable wireless radiation detector, determination as to whether or not the currently used radiation detector is being recharged may be made, and if an affirmative determination is made, the calibration may be enabled. In this manner, such a situation that the calibration is carried out when the currently used radiation detector is not being recharged, i.e., when it is highly likely that imaging will be carried out can be prevented.

BRIEF DESCRIPTION OF THE DRAWINGS

FIG. 1 is a schematic diagram illustrating a radiographic imaging system, to which a radiographic imaging apparatus according to an embodiment of the present invention is applied, FIG. 2 is a diagram illustrating the structure of a database, FIG. 3 is a flow chart illustrating a calibration process carried out in an embodiment of the invention, and FIG. 4 is a flow chart illustrating a condition determination process for carrying out calibration.

DESCRIPTION OF THE PREFERRED EMBODIMENTS

Hereinafter, an embodiment of the present invention will be described with reference to the drawings. FIG. 1 is a schematic diagram illustrating a radiographic imaging system, to which a radiographic imaging apparatus according to an embodiment of the invention is applied. As shown in FIG. 1, the radiographic imaging system 1 according to this embodiment includes two imaging units 10A and 10B, and a console 30.

The imaging unit 10A is a supine-position type imaging unit that obtains a radiographic image of a subject H in the supine position, and includes an irradiation control unit 12A, a radiation source 14A, an imaging table 16A and a radiation detection unit 18A. An imaging unit 10B is an upright-position type imaging unit that obtains a radiographic image of the subject H in the upright position, and includes an irradiation control unit 12B, a radiation source 14B, a mount 16B and a radiation detection unit 18B. Although the radiographic imaging system 1 of this embodiment only includes the supine-position type and upright-position type imaging units, the radiographic imaging system 1 may further include an imaging unit that can perform free imaging of the subject H in an arbitrary position.

The irradiation control units 12A and 12B drives the radiation sources 14A and 14B, respectively, to control the irradiance level such that radiation having a prescribed intensity is applied for a prescribed time. The radiation applied from each of the radiation sources 14A and 14B is transmitted through the subject H on the imaging table 16A or in front of the mount 16B and enters the radiation detection unit 18A or 18B.

The radiation detection units 18A and 18B include cassettes 20A and 20B, respectively, which contain FPDs 22A and 22B, respectively. The radiation transmitted through the subject H is detected by the FPD 22A or 22B and is converted into an electric signal (radiographic image data). The radiation detection units 18A and 18B are connected to the console 30 via a cable 50, so that the radiographic image data (analog data) obtained by imaging the subject H is outputted from the radiation detection unit 18A or 18B to the console 30 via the cable 50. Each of the radiation detection units 18A and 18B includes a connector (not shown) for connecting the cassettes 20A and 20B to the cable 50, respectively.

The FPDs 22A and 22B may be formed by direct-type FPDs, which directly convert the radiation into an electric charge, or indirect-type FPDs, which once convert the radiation into light, and then convert the light into an electric signal. The direct-type FPD is formed by a photoconductive film, such as amorphous selenium, a capacitor, a TFT (Thin Film Transistor) serving as a switching element, etc. When radiation, such as an x-ray, is applied to the direct-type FPD, electron-hole pairs (e-h pairs) generate from the photoconductive film. The electron-hole pairs are stored in the capacitor, and the electric charge stored in the capacitor is read out as an electric signal via the TFT.

On the other hand, the indirect-type FPD is formed by a scintillator layer made of a fluorescent material, a photodiode, a capacitor, a TFT, etc. When radiation, such as "CsI: Tl" is applied to the indirect-type FPD, the scintillator layer emits luminescence (fluorescence). The luminescence emitted by the scintillator layer is subjected to photoelectric conversion by the photodiode and stored in the capacitor. Then, the electric charge stored in the capacitor is read out as an electric signal via the TFT.

The console 30 includes an imaging data processing unit 32, an image processing unit 34, an output unit 36, a storage unit 38, a detection unit 40, an information obtaining unit 42, an input unit 44, a timer 46 and a control unit 48.

The imaging data processing unit 32 applies data processing, such as A/D conversion, to the radiographic image data inputted from the imaging units 10A and 10B. The imaging data processing unit 32 outputs digital radiographic image data subjected to the data processing.

The image processing unit 34 applies predetermined image processing to the radiographic image data outputted from the imaging data processing unit 32 using image processing parameters stored in the storage unit 38. The image processing applied by the image processing unit 34 may be various types of image processing, such as pixel defect correction and generation of a defection map used for the pixel defect correction, image calibration (correction of the radiographic image data using calibration data) including offset correction using a dark image, gain correction and shading correction using a predetermined uniform-exposure image, as well as tone correction and density correction, data conversion, such as conversion of image data into data for display on a monitor or print output, etc.

It should be noted that the image processing unit 34 is formed by a program (software) executed on a computer, a dedicated hardware, or a combination thereof. The image processing unit 34 outputs the radiographic image data subjected to the image processing.

The output unit 36 outputs the radiographic image data subjected to the image processing, which has been inputted from the image processing unit 34. The output unit 36 may, for example, be a monitor for displaying the radiographic image on a screen thereof, a printer for outputting the radiographic image as a print, or a storage device for storing the radiographic image data. In this embodiment, the output unit 36 includes a monitor 36A, which displays the radiographic image and various screens for operation of the radiographic imaging system 1.

The storage unit 38 includes a memory 38a, which stores the calibration data for calibrating the image and image processing parameters used for various types of image processing at the image processing unit 34, and an image memory 38b for storing the radiographic image data, etc. The memory 38a for storing the calibration data and the image memory 38b for storing the radiographic image data may be physically different memories, or may be different memory regions of a single memory. The memories 38a and 38b may be a recording medium, such as a hard disk. Further, the memories 38a and 38b may be built in the image processing unit 34, or may be provided externally and connected to the console 30.

To obtain the calibration data, when the power supply to the radiographic imaging system 1 according to this embodiment is turned on, the detection unit 40 detects conditions including that power is applied to the FPDs 22A and 22B contained in the cassettes 20A and 20B, that a predetermined time period has elapsed from the application of power to the FPDs 22A and 22B, and that the cassettes 20A and 20B are loaded in the imaging units 10A and 10B (more specifically, that the cassettes 20A and 20B are connected to the cable 50). Then, the detection unit 40 outputs a detection signal to the control unit 48. It should be noted that the detection unit 40 outputs the detection signal when the detection unit 40 has detected at least one of the three conditions.

The detection of the fact that the cassettes 20A and 20B are loaded in the imaging units 10A and 10B is achieved by detecting that connections between the cassette 20A and the console 30 and between the cassette 20B and the console 30 are established when the cassettes 20A and 20B are connected to the cable 50. After the detection unit 40 has detected that the cassettes 20A and 20B are loaded, the detection unit 40 monitors an elapsed time using a timer 46 to detect that the predetermined time has elapsed after the cassettes 20A and 20B have been loaded.

When the detection unit 40 has detected at least one of the three conditions, the information obtaining unit 42 calibrates the FPDs 22A and 22B to obtain the calibration data. The calibration is achieved by obtaining first detection images (dark images) from the FPDs 22A and 22B in an imaging environment without the subject H at the imaging units 10A and 10B and without applying the radiation to the FPDs 22A and 22B from the radiation sources 14A and 14B, obtaining second detection images from the FPDs 22A and 22B without the subject with applying predetermined uniform radiation to the FPDs 22A and 22B from the radiation sources 14A and 14B, and then obtaining the calibration data, which is used for the offset correction, the gain correction, the shading correction and the defect correction, for example, from the first and second detection images.

The thus obtained calibration data is stored in a database in the memory 38a of the storage unit 38 as new calibration data with being associated with the ID of the cassette from which the calibration data was obtained. FIG. 2 illustrates the structure of the database. As shown in FIG. 2, a database DB0 stores IDs of the cassettes, which may be used in the radiographic imaging system 1 according to this embodiment, and calibration information containing the calibration data associated with each ID. The calibration information may include, besides the calibration data, information, such as the time and date when the calibration was carried out to obtain each calibration data, the accumulated number of times of imaging with the cassette from which each calibration data was obtained, and whether each cassette is available for emergency imaging. The calibration data and the time and date when the calibration was carried out are updated each time the information obtaining unit 42 carries out calibration, and the accumulated number of times of imaging is updated each time the cassette is used for imaging. The information about whether the cassette is available for emergency imaging is updated when the operator feeds an instruction about the availability of emergency imaging via the input unit 44. In the image processing unit 34, the calibration data is read out from the storage unit 38 based on the ID of the cassette in each of the imaging units 10A and 10B connected to the cable 50, and is used for calibrating the radiographic image.

The input unit 44 is formed by known input means, such as a keyboard, for inputting various settings to the console 30, instructions to carry out imaging, calibration, etc.

The control unit 48 controls parts of the imaging units 10A and 10B and the console 30 according to imaging instruction signals inputted from the input unit 44. The control unit 48 controls the imaging units 10A and 10B so that imaging is carried out according to a predetermined imaging menu, imaging conditions or imaging mode, for example. Further, the control unit 48 exerts control so that the image data of the imaged radiographic image is obtained and the image processing is carried out at the image processing unit 34. Further, the control unit 48 controls parts of the console 30 to carry out the calibration, which is the feature of this embodiment.

Next, a process carried out in this embodiment is described. This embodiment is characterized by the content of a calibration process. Therefore, explanation of the operation to obtain the radiographic image of the subject H is omitted, and only the calibration process is described. FIG. 3 is a flowchart illustrating the calibration process carried out in this embodiment. The detection unit 40 monitors whether at least one of the conditions, which includes that power is applied to the FPDs 22A and 22B, that a predetermined time period has elapsed from the application of power to the FPDs 22A and 22B, and that the cassettes 20A and 20B are loaded in the imaging units 10A and 10B, is detected (step ST1). If an affirmative determination is made in step ST1, the detection signal is outputted from the detection unit 40 to the control unit 48, and the ID of the currently used cassette is outputted from the cassette to the control unit 48. Using this ID, the control unit 48 searches for the calibration information of the FPD contained in the currently connected cassette from the database of the storage unit 38 (step ST2). If there are two or more currently used cassettes, the operations in step ST2 and the following steps are carried out for each cassette.

Then, the control unit 48 determines the condition for carrying out the calibration (step ST3). FIG. 4 is a flow chart illustrating a process for determining the condition for carrying out the calibration. First, the control unit 48 obtains the information of the time and date when the last calibration was carried out from the searched-out calibration information, and determines whether or not the elapsed time from the obtained time and date to the current time and date is within a predetermined time (step ST11). The predetermined time may, for example, be 24 hours. However, since the FPD deteriorates over time, the predetermined time may be decreased depending on the elapsed time period from the beginning of use of the FPD in the currently connected cassette.

If an affirmative determination is made in step ST11, the control unit 48 further obtains the information of the accumulated number of times of imaging from the searched-out calibration information, and determines whether or not the obtained accumulated number of times of imaging is within a predetermined number of times (step ST12). Since the FPD deteriorates over time, the predetermined number of times may be decreased depending on the elapsed time period from the beginning of use of the FPD in the currently connected cassette. If an affirmative determination is made in step ST12, the control unit 48 determines that the calibration is unnecessary (step ST13), and the determination process ends.

If negative determinations are made in steps ST11 and ST12, the control unit 48 obtains the information of the availability of emergency imaging contained in the calibration information, and determines whether or not the currently used cassette is set as being available for emergency imaging based on the obtained information (step ST14). If a negative determination is made in step ST14, the control unit 48 determines that the calibration is necessary (step ST15), and the determination process ends. It should be noted that, if a negative determination is made in step ST12, the control unit 48 may immediately determine that the calibration is necessary without carrying out the operation in step ST14.

On the other hand, if an affirmative determination is made in step ST14, the control unit 48 notifies that the system 1 is available for emergency imaging (step ST16), and the process ends. Specifically, a notification to the effect that the emergency imaging is available is displayed on the monitor 36A the output unit 36. The notification to the effect that the emergency imaging is available may be displayed using a text message or an image. Alternatively, a warning tone or a warning lamp may be used for the notification. In this state, the calibration may be carried out in response to an instruction from the operator. Further, the elapsed time counted by the timer 46 may be detected, and if no operation, such as imaging, is carried out when a certain time has elapsed from the beginning of the display of the notification to the effect that the emergency imaging is available, the information obtaining unit 42 may carry out the calibration after the certain time has elapsed.

Returning to FIG. 3, if it is determined that the calibration is necessary, the information obtaining unit 42 carries out the calibration (step ST4). With this, the calibration data is obtained, and the calibration information stored in the memory 38a of the storage unit 38 is updated. On the other hand, if it is determined that the calibration is unnecessary, the process ends. It should be noted that, if an instruction to carry out imaging is fed during the calibration, the calibration may be stopped to carry out imaging. In this case, calibration of the radiographic image data obtained by the imaging is carried out using the calibration data currently stored in the memory 38a.

As described above, according to this embodiment, the conditions including that power is applied to the FPDs 22A and 22B, that a predetermined time period has elapsed from the application of power to the FPDs 22A and 22B, and that the cassettes 20A and 20B are loaded in the imaging units 10A and 10B are detected, and when at least one of these conditions is detected, determination is made as to whether or not the calibration information of the FPD contained in the currently used cassette is appropriate. Then, if a negative determination is made, the calibration is carried out. Thus, the calibration is not carried out when it is unnecessary, thereby achieving efficient calibration.

Further, by determining whether or not the currently connected cassette is available for emergency imaging, and notifying that emergency imaging is available if an affirmative determination is made as to the availability of emergency imaging, such a situation that the calibration is carried out when it is necessary to immediately carry out the imaging, such as in the case of an urgent patient, can be prevented.

Although the information obtaining unit 42 in the above-described embodiment carries out the calibration when it is determined that calibration is necessary, a notification to that effect may be displayed on the monitor 36A of the output unit 36 when it is determined that calibration is necessary, and the calibration may be carried out when an instruction is fed by the operator. In this case, if the instruction from the operator is not fed within a certain time, the information obtaining unit 42 may carry out the calibration after the certain time has elapsed. The notification to the effect that the emergency imaging is available may be displayed using a text message or an image. Alternatively, a warning tone or a warning lamp may be used for the notification in place of the display.

Further, although the cassettes 20A and 20B are connected to the console 30 via the cable 50 in the above-described embodiment, wireless type cassettes, which send the radiographic image data detected by the FPDs 22A and 22B to the console 30 via wireless communication, may be used. In this case, the console 30 is provided with a wireless interface for communication with the cassettes, and communicates with the wireless-type cassettes via the wireless interface to send or receive the cassette IDs and the radiographic image data. In the case where the wireless-type cassettes are used, the console 30 recognizes the cassettes when the power supply to the system 1 is turned on and the power supply to the cassettes are turned on, and communication between the cassettes and the console 30 is established. Therefore, in the case where the wireless-type cassettes are used, the detection unit 40 may detect the conditions that power is applied to the FPDs 22A and 22B and that the cassettes 20A and 20B are loaded in the imaging units 10A and 10B by detecting that the wireless communication between the cassettes and the console 30 is established.

Since the wireless-type cassette contains a battery, the power supply is frequently turned on or off in order to prevent wasteful power consumption by the battery. If the timing of calibration is set such that the calibration is carried out when it is detected that power supply to the cassettes is turned on, the calibration will be carried out each time the power supply is turned on, and it is frequent in the case of the wireless cassettes. In this embodiment, after the power supply is turned on, determination is made as to whether or not the calibration information is appropriate. Therefore, even in the case of the wireless cassettes where the power supply is frequently turned on or off, the calibration is not carried out when it is unnecessary. Thus, efficient calibration can be achieved without impairing the imaging efficiency.

Further, the wireless-type cassettes require recharging of the battery, and imaging is not carried out while the cassettes are recharged. Therefore, in the case where the cassettes 20A and 20B loaded in the imaging units 10A and 10B are wireless cassettes, determination as to whether or not the cassettes are being recharged may be made, and the calibration may be carried out only when the cassettes are being recharged.

In the above-described embodiment, the imaging units 10A and 10B may be provided with a temperature sensor and/or a humidity sensor, and the temperature and humidity at the time and date when the calibration is carried out may be stored as the calibration information. Then, the current temperature and/or humidity may be compared with the temperature and/or humidity contained in the searched-out calibration information, and if the current temperature and/or humidity have varied from the stored temperature and/or humidity by an extent exceeding a predetermined threshold, it may be determined that the calibration is necessary.

The system 1 according to the embodiment of the invention has been described. The present invention may also be implemented in the form of a program for causing a computer to function as means corresponding to the imaging data processing unit 32, the image processing unit 34, the detection unit 40, the information obtaining unit 42 and the control unit 48 described above, and carry out the operations as shown in FIGS. 3 and 4. The present invention may also be implemented in the form of a computer-readable recording medium containing such a program.

What is claimed is:

1. A radiographic imaging apparatus for taking a radiographic image of a subject using a radiation detector, the apparatus comprising:

information obtaining means for obtaining calibration information by carrying out calibration of the radiation detector;

storage means for storing the calibration information of at least one radiation detector with associating the calibration information with the at least one radiation detector;

image processing means for applying image processing to imaging data of the radiographic image of the subject detected by the radiation detector based on the calibration information;

detecting means for detecting at least one of conditions including that power is applied to the radiation detector, that a predetermined time period has elapsed from the application of power, and that the radiation detector is connected; and control means for determining, when at least one of the conditions is detected by the detecting means, whether or not the calibration information of the currently used radiation detector is appropriate, and if a negative determination is made, controlling the information obtaining means to enable the calibration, wherein the control means determines, with respect to the currently used radiation detector, that the calibration is unnecessary in the case that: 1) an elapsed time is within a predetermined time period from a time and date when the last calibration was carried out and the power was turned off at least once, and 2) an accumulated number of times of imaging with the radiation detector is within a predetermined number of times.

2. The radiographic imaging apparatus as claimed in claim 1, wherein the control means determines, with respect to the currently used radiation detector, whether or not emergency imaging is available, and if a negative determination is made as to whether or not the calibration information is appropriate and if an affirmative determination is made as to the availability of the emergency imaging, the control means notifies that the emergency imaging is available.

3. The radiographic imaging apparatus as claimed in claim 1, wherein the control means stops obtaining the calibration information if an instruction to carry out imaging using the radiation detector is fed when the information obtaining means is obtaining the calibration information.

4. The radiographic imaging apparatus as claimed in claim 1, wherein, in a case where the currently used radiation detector is a rechargeable wireless radiation detector, the control means determines whether or not the currently used radiation detector is being recharged, and if an affirmative determination is made, the control means enables the calibration.

5. A radiographic imaging method for use with a radiographic imaging apparatus for taking a radiographic image of a subject using a radiation detector, the apparatus including:

information obtaining means for obtaining calibration information by carrying out calibration of the radiation detector; storage means for storing the calibration information of at least one radiation detector with associating the calibration information with the at least one radiation detector; and image processing means for applying image processing to imaging data of the radiographic image of the subject detected by the radiation detector based on the calibration information, the method comprising:

detecting at least one of conditions including that power is applied to the radiation detector, that a predetermined time period has elapsed from the application of power, and that the radiation detector is connected;

determining, when at least one of the conditions is detected by the detecting means, whether or not the calibration information of the currently used radiation detector is appropriate; and if a negative determination is made, controlling the information obtaining means to enable the calibration, wherein when determining whether or not the calibration information is appropriate, with respect to the currently used radiation detector, determining that the calibration is unnecessary in the case that: 1) an elapsed time is within a predetermined time period from a time and date when the last calibration was carried out and the power was turned off at least once, and 2) an accumulated number of times of imaging with the radiation detector is within a predetermined number of times.

6. A non-transitory computer-readable recording medium containing a program for causing a computer to function as a radiographic imaging apparatus for taking a radiographic image of a subject using a radiation detector, the program causing the computer to function as: information obtaining means for obtaining calibration information by carrying out calibration of the radiation detector; storage means for storing the calibration information of at least one radiation detector with associating the calibration information with the at least one radiation detector; image processing means for applying image processing to imaging data of the radiographic image of the subject detected by the radiation detector based on the calibration information; detecting means for detecting at least one of conditions including that power is applied to the radiation detector, that a predetermined time period has elapsed from the application of power, and that the radiation detector is connected; and control means for determining, when at least one of the conditions is detected by the detecting means, whether or not the calibration information of the currently used radiation detector is appropriate, and if a negative determination is made, controlling the information obtaining means to enable the calibration, wherein the control means determines, with respect to the currently used radiation detector, that the calibration is unnecessary in the case that: 1) an elapsed time is within a predetermined time period from a time and date when the last calibration was carried out and the power was turned off at least once, and 2) an accumulated number of times of imaging with the radiation detector is within a predetermined number of times.

\* \* \* \* \*